United States Patent Office 3,574,050
Patented Apr. 6, 1971

3,574,050
PROCESS FOR SEPARATING INTO ITS COMPONENTS AND RECOVERING FOR REUSE PLASTIC COATED PAPER
John C. Rice, Tenafly, N.J., assignor to Lowe Paper Company, Ridgefield, N.J.
No Drawing. Continuation-in-part of abandoned application Ser. No. 74,983, Dec. 9, 1960. This application Aug. 21, 1962, Ser. No. 218,463
Int. Cl. D21b 1/08, 1/32; D21c 5/02
U.S. Cl. 162—5
7 Claims

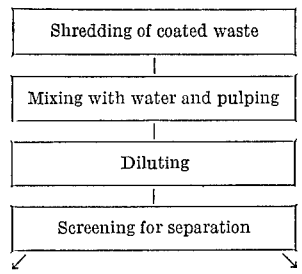

ABSTRACT OF THE DISCLOSURE

Paper Stock material coated with synthetic plastics is separated into its components for reuse. The coated paper is shredded into about one-half to two inch strips. The strips are pulped into water at a temperature of about 160° F. where the defibering is accomplished without disintegration of the plastic waste. The pulped material is then screened whereby the plastic waste is separated from the cellulosic material.

This application is a continuation-in-part of my application Ser. No. 74,983, filed Dec. 9, 1960, now abandoned.

This invention relates to a process for separating into its components and recovering for reuse certain waste materials which heretofore have had no commercial value. For example, there exist large quantities of scrap trimmings from industrial plants manufacturing polyethylene coated carton and container paper stock. Under the prevailing trend it may be assumed that, for instance, almost all milk carton stock will eventually be coated with polyethylene on both sides. The manufacturing waste or broke from this stock is currently discarded. The invention concerns a process by which such waste is separated into its two initial components, i.e., plastic and cellulose fiber.

Many attempts have been made to achieve the desired results in the recovery of these waste materials, for example, by means of solvent extraction. This method relies upon actually dissolving the plastic by use of organo-hydrophobic solvents and subsequent separation from the paper material through filtration of the fiber along with subsequent washing and reclamation of the solvent. However, along with an enormous initial investment, plus substantial high cost in both solvent and process costs, this solvent extraction process is not economically feasible and remains only a laboratory curiosity.

On the other hand, the process of the present invention is unique in that it handles both the organo-hydrophobic plastic and the hydrophilic fibrous material without the use of an expensive organic solvent and yet manages a commercially complete separation. Therefore, two valueless materials can be economically recovered in the form of two very useful and valuable materials by means of standard equipment used in this art.

The process of the present invention is applicable to paper stock material coated with all sorts of pliable synthetics, such as polyethylene, polypropylene, polyvinylchloride, polyvinylidenechloride, their copolymers and the like, commonly known in the paper art for their barrier properties, also to be further designated as "plastic barrier materials."

Reference is made to the following flow diagram, wherein a schematic representation of the process of the invention is shown.

In this process, the waste is received usually in bales in various forms. In a preferred manner of carrying out this process, the polyethylene coated waste is first chopped in a shredder to uniform size, into approximately one-half to two inch strips. The size of these strips is of considerable importance because it determines the power required in the pulping step which follows. Too large a strip would require the use of large uneconomical amounts of pulping horsepower. Too small a strip would result in poor drainage and plugging of the screening system. It has been found that a minimum of 3/8" to maximum of 6" width gives the best results. The length of shredded material can usually vary from 2 inches to 12 inches.

After shredding, the material is fed into a pulper where it is mixed with water for a minimum of thirty minutes at a temperature of approximately 160° F. at a solids content of no more than 7.0% under high agitation. Both the time and temperature requirements are accurately controlled so that, with sufficient heat and time, separation between the plastic and the cellulose substrata of fibers takes place at a commercial or economical time cycle. The time and temperature of pulping corresponds to times and temperatures generally used for paper pulping and under such conditions that the defibering of the paper is accomplished without disintegration of the plastic waste. These conditions include the usual centrifugal action which is characteristic of well-known pulpers. Under these same conditions, whether the pulper is of the batch type or of the continuous pulping type, the material normally is subjected to further cutting because of the moving parts within the pulper. Since this plastic waste is usually of a thermoplastic nature and generally hydrophobic, there is no danger that complete disintegration of the plastic will occur within the time and temperature limitations generally used in the pulping step required for defibering, provided the ambient temperature is maintained below the softening point of the plastic. This can be accomplished at a minimum temperature of approximately 100–120° F. and pulping for a minimum time period of 10 minutes.

The more exact time and temperature cycle is dependent upon the type of plastic coated board and the shape in which it is fed into the pulper. While the optimum size of the paper strips was indicated above, other sizes or shapes can also be used, such as milk carton, cup stock waste, edge trimmings, or sheets, but in this case the pulping conditions have to be adjusted to the size of the waste material.

While most commercial pulpers can be satisfactorily used for the process of the present invention, it is preferred to use a pulper having a minimum capacity of approximately 2.5 horsepower tons/day. The addition of a wetting agent (e.g., alkyl aryl sulfonate or a polyether type) in the pulping operation reduces the shredded waste into homogeneous mass, which flows into a chest by gravity. To the chest is added a small amount of dilution water, making the solid content approximately 6.0–6.5%. From the chest, the mass is pumped into a series of rotary or vibrating screen systems where the plastic wastes are drawn off from the paper fiber. A rotary screen, preferably in the form of a perforated rotating cylinder approximately 36" in diameter, is set on an incline so that the rejects will tumble out and through the inside core and the accepts will wash through the perforations. 10 r.p.m. is generally the average rotating speed of the rotary screen.

In the alternative, or in combination with a rotary screen system, a vibrating system can be used, which substantially consists of a flat bed screen set to vibrating motion by means of a motor whose drive shaft is an eccentric. The rejects remain on the surface of the screen and are washed off by a series of showers coupled with the vibrating action. The accepts are washed through the screen openings. Any type of screening machine, e.g. the types made by Tyler, Black Clawson and Bird Machine Company, rotary and/or vibrating, may be used.

According to the particle size, which has been controlled in the pulping cycle, the selection of the screen openings is extremely important. In the process of this invention it has been discovered that $14/64''-18/64''$ is the range of screen opening diameters which give the most efficient results. This screen has approximately 14% open area with openings having staggered centers at an approximate distance of $5/8''$ from center to center. In the next screening step of the series of screens, the pulp is sent through a secondary screening system. The screens in this system may again be either vibrating or rotary. The holes in the secondary screen system are smaller, so as to separate the plastic particles which may have passed through the first screening. The openings here can range approximately from $4/64''$ to $8/64''$, the screen having approximately 23% open area and staggered centers at a distance of approximately $12/64''$ center to center.

Depending on the quality requirements of the product to be made from the reclaimed fibers, the mass passed by the primary and the secondary screening systems may be subjected to a final screening step, to remove all the small plastic particles that may still remain in the mass, and which would cause "specks" in the final product and make it commercially unacceptable for most applications. The screen openings in the final stage range approximately between 0.050" and 0.074" in diameter and having approximately 12% open area.

The effect of screening is to allow the fiber to be washed through into the papermaking system and yet reject the strands or particles of polyethylene or other plastic, which are then put through a re-washing and drying stage. Therefore in order to maintain an economical and commercial production rate and yet insure plastic "speck-free" paper, the actual openings and hole diameters in the screening process are extremely important.

The process of the invention has proved to be applicable for the recovery of waste milk-carton stock, and various other polyethylene and other polyvinylchloride cup stocks currently in commercial use such as polyvinylidenechloride coated paper or board waste.

The waste shredding operation is preferred for optimal efficiency but not a necessary step of the process of the present invention.

In the following the invention will be more fully described in a number of examples.

EXAMPLE 1

An E. D. Jones Company Hi-Lo Pulper equipped with a 300 H.P. motor is charged with 1 ton of two-side plastic coated milk carton stock. The charged stock is diluted with steam and water to bring the solid contents to 6.5% and the temperature to 150° F. The raw stock can vary in size from carton blanks (approximately 18 inches by 12 inches) to large sheets (approximately 3 feet by 4 feet). The pulper is being run approximately 12–15 minutes after which time the defibering is adequate for subsequent separating operation. After the pulping step, as per any one of Examples 1–4, the pulped mass is pumped or fed by other means into a rotary screen at a rate of approximately 10 tons per hour. The rotary screen, as indicated in the specification, is a perforated rotating cylinder approximately 36 inches in diameter. The screen perforations have an approximate diameter of $15/64''$ and measure $5/16''$ from center to center. The fiber is washed through the $15/64''$ holes by a series of showers and subsequently pumped into a vibrating screen, such as made e.g. by Tyler, Black Clawson, Bird Machine Company, etc. The Bird Machine Company screen used in the present example has $5/64''$ hole diameters and $11/64''$ from center to center. The stock slurry is then pumped into a centrifugal screen, such as manufactured by the Bird Machine Company, containing hole diameter of 0.06 inch. By screening the pumped mass through such a series of diminishing size screen perforations, the plastic waste is kept to a commercially acceptable limit in the paper system.

After the separation in the last screen, the clean fiber flows into storage to be used for paper manufacturing.

EXAMPLE 2

A ton of two-inch wide polyethylene coated paper board milk carton waste is shredded into half-inch wide strips. The strips are subsequently charged into a Rice Barton dynopulper along with 3,200 gallons of water and based on the dry waste, with a 0.1% Triton X–100, a wetting agent. The stock is then pulped for 35 minutes at 175° F. and then dumped into a chest. Here, another 252 gallons of water are added to the pulped stock.

In this and the following examples the steps subsequent to the pulping step can be accomplished as described in the latter part of Example 1.

EXAMPLE 3

A 1-ton batch of polyethylene coated cup blanks is dumped into a Rice Barton Dynopulper and water is added to bring the percentage of the solids (consistency) to approximately 5%. The Dynopulper is equipped with a 150 H.P. motor. Steam is added with or after the water has been added to bring the temperature of the mixture to 140° F. The addition of steam is preferred, however, during the step of mixing the waste with the water. The pulper is subsequently run for 20 minutes at 140° F. at which point the defibering is complete.

EXAMPLE 4

A 200 H.P. Impco Solvo Pulper, manufactured by The Improved Machinery Company, is charged with 1 ton of vinyl coated edge trimmings, which have been shredded to a size of approximately 1 inch by 5 inches. Water and steam are subsequently added, bringing the mix to 5% solids content, at a temperature of approximately 150° F. The pulper is run for approximately 14–18 minutes at the above temperature at which the defibering is completed.

While the invention has been described with particular reference to specific embodiments, it is to be understood that it is not limited thereto but is to be construed and interpreted from the scope of the appended claims.

What I claim is:

1. A method of separating polyethylene and paper fibers from polyethylene coated paper board, comprising the steps of shredding polyethylene coated board into strips substantially $1/2''$ wide, subjecting said strips at a temperature of about 175° F. to a pulping operation for about thirty-five minutes while adding for each ton of said coated paper board 3,200 gallons of water and 0.1% of an aryl alkyl polyether alcohol, transferring the resulting pulp slurry into a chest, reducing the solids content by the addition of 252 gallons of water calculated per ton to said coated paper board, to 6–6.5% pumping the pulp slurry at the rate of approximately 10 tons per hour into a first screen having screen holes $15/64''$ in diameter, from said first screen into a second screen having screen holes $5/64''$ in diameter, and from said second screen into a final screen having screen holes 0.06 inch in diameter, whereby the polyethylene is completely separated from the paper fibers.

2. A method of reclaiming a synthetic thermoplastic barrier material and paper fiber from paper and boxboard coated with said synthetic thermoplastic barrier material, which comprises shredding said coated paper or boxboard, preparing a mixture consisting essentially of said shredded paper or boxboard and water so as to adjust the solids content to not more than 7%, agitating the mass in a pulper at a temperature between 100° F. and the temperature at which the thermoplastic softens for at least ten minutes to accomplish defibering without disintegration of the plastic, and separating the plastic from the fibers by passing through a plurality of screens.

3. A method according to claim 2, wherein the slurry is agitated at a temperature from 100° F. to about 175° F. for about thirty minutes with addition of a wetting agent, whereupon the solids content is reduced to 6.0–6.5% by further addition of water, and the thus obtained mass is passed through a plurality of screens for separating the plastic and the paper fibers.

4. The method of claim 3, whereby said plurality of screens comprises a first screening system having openings substantially between 14/64 and 18/64 of an inch, a second screening system having openings substantially between 4/64 and 8/64 of an inch, and a final screening system having openings between 0.05 and 0.074 inch.

5. The method of claim 3, wherein the synthetic plastic barrier material is a polyolefin.

6. The method of claim 3, wherein said synthetic plastic barrier material is polyethylene.

7. The method of claim 3, wherein said plastic barrier material is selected from the group consisting of polyvinyl chlorides and polyvinylidene chlorides.

References Cited

UNITED STATES PATENTS

| | | | |
|---|---|---|---|
| 1,964,191 | 6/1934 | Branchen | 260—2.3 |
| 2,654,716 | 10/1953 | Sorenson | 260—2.3 |
| 2,916,216 | 12/1959 | Altmann | 241—21X |
| 2,917,245 | 12/1959 | Polleys | 241—21X |
| 3,051,609 | 8/1962 | Grossman | 162—5 |
| 3,051,610 | 8/1962 | Grossman | 162—5 |
| 1,680,949 | 8/1928 | Lukens | 162—5 |
| 2,072,487 | 3/1937 | Snyder | 162—5 |
| 3,154,255 | 10/1964 | Schulman et al. | |

HOWARD R. CAINE, Primary Examiner

U.S. Cl. X.R.

162—55